(12) United States Patent
Lee et al.

(10) Patent No.: US 9,630,882 B2
(45) Date of Patent: Apr. 25, 2017

(54) FERRITE AND COIL ELECTRONIC COMPONENT INCLUDING THE SAME

(71) Applicants: Young Il Lee, Suwon-Si (KR); Byeong Cheol Moon, Suwon-Si (KR)

(72) Inventors: Young Il Lee, Suwon-Si (KR); Byeong Cheol Moon, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/924,911

(22) Filed: Oct. 28, 2015

(65) Prior Publication Data

US 2016/0155560 A1    Jun. 2, 2016

(30) Foreign Application Priority Data

Nov. 21, 2014 (KR) .......................... 10-2014-0163678

(51) Int. Cl.
| | |
|---|---|
| *H01F 17/04* | (2006.01) |
| *C04B 35/26* | (2006.01) |
| *H01F 1/34* | (2006.01) |
| *H01F 17/00* | (2006.01) |
| *H01F 27/29* | (2006.01) |

(52) U.S. Cl.
CPC .............. *C04B 35/26* (2013.01); *H01F 1/344* (2013.01); *H01F 17/0013* (2013.01); *H01F 17/04* (2013.01); *H01F 27/292* (2013.01); *C04B 2235/3279* (2013.01); *C04B 2235/3281* (2013.01); *C04B 2235/3284* (2013.01); *C04B 2235/77* (2013.01)

(58) Field of Classification Search
None
See application file for complete search history.

(56) References Cited

U.S. PATENT DOCUMENTS

| | | | | |
|---|---|---|---|---|
| 3,573,208 | A * | 3/1971 | Brockman | ............ C04B 35/265 252/62.62 |
| 4,057,458 | A * | 11/1977 | Maeda | ................... C30B 19/02 117/9 |
| 2004/0113742 | A1* | 6/2004 | Tanaka | .................. C04B 35/265 336/221 |

(Continued)

FOREIGN PATENT DOCUMENTS

| | | | |
|---|---|---|---|
| JP | 09263444 A | * | 10/1997 |
| JP | 2001176717 A | * | 6/2001 |

(Continued)

OTHER PUBLICATIONS

JPO Abstract Translation of JP 2001176717 A (pub. 2001).*
JPO Abstract Translation of JP 09263444 A (pub. 1997).*

*Primary Examiner* — Kevin Bernatz
(74) *Attorney, Agent, or Firm* — McDermott Will & Emery LLP

(57) ABSTRACT

A coil electronic component includes a magnetic body containing a ferrite; and a coil part including a plurality of conductive patterns disposed in the magnetic body. The ferrite contains 48 to 50 mol % of iron oxide calculated in terms of $Fe_2O_3$, 8 to 12 mol % nickel oxide calculated in terms of NiO, 28 to 31 mol % zinc oxide calculated in terms of ZnO, and 7 to 13 mol % copper oxide calculated in terms of CuO.

2 Claims, 4 Drawing Sheets

(56) References Cited

U.S. PATENT DOCUMENTS

| | | | | |
|---|---|---|---|---|
| 2011/0101113 A1* | 5/2011 | Koujima | ............ | G06K 19/07771 235/492 |
| 2013/0126264 A1* | 5/2013 | Takenoshita | ............ | H01F 1/344 181/175 |
| 2014/0252693 A1* | 9/2014 | Fujita | ............ | H01F 1/01 264/613 |
| 2015/0180128 A1* | 6/2015 | Ishikura | ............ | H01Q 7/06 343/788 |
| 2015/0228395 A1* | 8/2015 | Ochiai | ............ | C04B 35/26 336/221 |

FOREIGN PATENT DOCUMENTS

| | | |
|---|---|---|
| JP | 2007-302493 A | 11/2007 |
| JP | 2010-180125 A | 8/2010 |
| JP | 2010-278075 A | 12/2010 |
| JP | 2014-60289 A | 4/2014 |

\* cited by examiner

FERRITE AND COIL ELECTRONIC COMPONENT INCLUDING THE SAME

CROSS-REFERENCE TO RELATED APPLICATION

This application claims the benefit of priority to Korean Patent Application No. 10-2014-0163678, filed on Nov. 21, 2014 with the Korean Intellectual Property Office, the entirety of which is incorporated herein by reference.

BACKGROUND

The present disclosure relates to a ferrite and a coil electronic component including the same.

Electronic components such as inductors and ferrite bead inductors are important passive elements for configuring electronic circuits. Together with resistors and capacitors, they may be combined with capacitors through electromagnetic coupling to configure resonance circuits amplifying signals within a specific frequency band, a filter circuit, or the like.

The electronic component as described above may be manufactured using various methods. Examples include a method of winding a coil around or printing a coil on a ferrite core and forming electrodes on both ends of the ferrite core, a method of printing internal electrode patterns on magnetic or dielectric sheets to form portions of a coil and then laminating the sheets to form a coil, or the like.

In particular, since impedance (Z) and resistance (R) characteristics are important in inductors and ferrite bead inductors, a magnetic material having a high degree of magnetic permeability is required.

Furthermore, an automotive electronic product should be able to operate stably, even at high temperatures, without magnetic characteristics thereof being deteriorated, and in order to satisfy this requirement, a magnetic material having a high Curie temperature is also required.

SUMMARY

One aspect of the present disclosure provides a ferrite having high magnetic permeability and high temperature characteristics and a coil electronic component including the same.

According to one aspect of the present disclosure, a ferrite may contain iron (Fe), nickel (Ni), zinc (Zn), and copper (Cu) and have high magnetic permeability and excellent high-temperature characteristics, and a coil electronic component may include the ferrite.

The ferrite may contain iron (Fe), nickel (Ni), zinc (Zn), and copper (Cu). In the ferrite, a content of iron (Fe) calculated in terms of iron oxide ($Fe_2O_3$) may be 48 to 50 mol %, a content of nickel (Ni) calculated in terms of nickel oxide (NiO) may be 8 to 12 mol %, a content of zinc (Zn) calculated in terms of zinc oxide (ZnO) may be 28 to 31 mol %, and a content of copper (Cu) calculated in terms of copper oxide (CuO) may be 7 to 13 mol %.

According to another aspect of the present disclosure, a coil electronic component comprises a magnetic body containing a ferrite; and a coil part including a plurality of conductive patterns disposed in the magnetic body, wherein the ferrite contains: 48 to 50 mol % of iron oxide calculated in terms of $Fe_2O_3$, 8 to 12 mol % nickel oxide calculated in terms of NiO, 28 to 31 mol % zinc oxide calculated in terms of ZnO, and 7 to 13 mol % copper oxide calculated in terms of CuO.

c and b may satisfy $2.6 \leq c/b \leq 3$, where b is a mol % of the nickel oxide, and c is a mol % of the zinc oxide.

c and d may satisfy $2.4 \leq c/d \leq 3.3$, where c is a mol % of the zinc oxide, and d is a mol % of the copper oxide.

b, c, and d may satisfy $2.6 \leq c/b \leq 3$ and $2.4 \leq c/d \leq 3.3$, where b is a mol % of the nickel oxide, c is a mol % of the zinc oxide, and d is a mol % of the copper oxide.

The magnetic body may comprise a plurality of sintered laminated magnetic layers containing the ferrite.

According to another aspect of the present disclosure, a coil electronic component comprises a magnetic body containing a ferrite; and a coil part including a plurality of conductive patterns disposed in the magnetic body, wherein the ferrite consists essentially of $aFe_2O_3$-bNiO-cZnO-dCuO, wherein $2.6 \leq c/b \leq 3$ and $2.4 \leq c/d \leq 3.3$.

According to another aspect of the present disclosure, $48 \leq a \leq 50$, $8 \leq b \leq 12$, $28 \leq c \leq 31$, and $7 \leq d \leq 13$.

When a mol % of the nickel (Ni) calculated in terms of nickel oxide (NiO) is defined as b, a mol % of the zinc (Zn) calculated in terms of zinc oxide (ZnO) is defined as c, and a mol % of the copper (Cu) calculated in terms of copper oxide (CuO) is defined as d, the ferrite may satisfy $2.6 \leq c/b \leq 3$ and $2.4 \leq c/d \leq 3.3$.

BRIEF DESCRIPTION OF DRAWINGS

The above and other aspects, features and other advantages of the present disclosure will be more clearly understood from the following detailed description taken in conjunction with the accompanying drawings.

DETAILED DESCRIPTION

Figure 1:
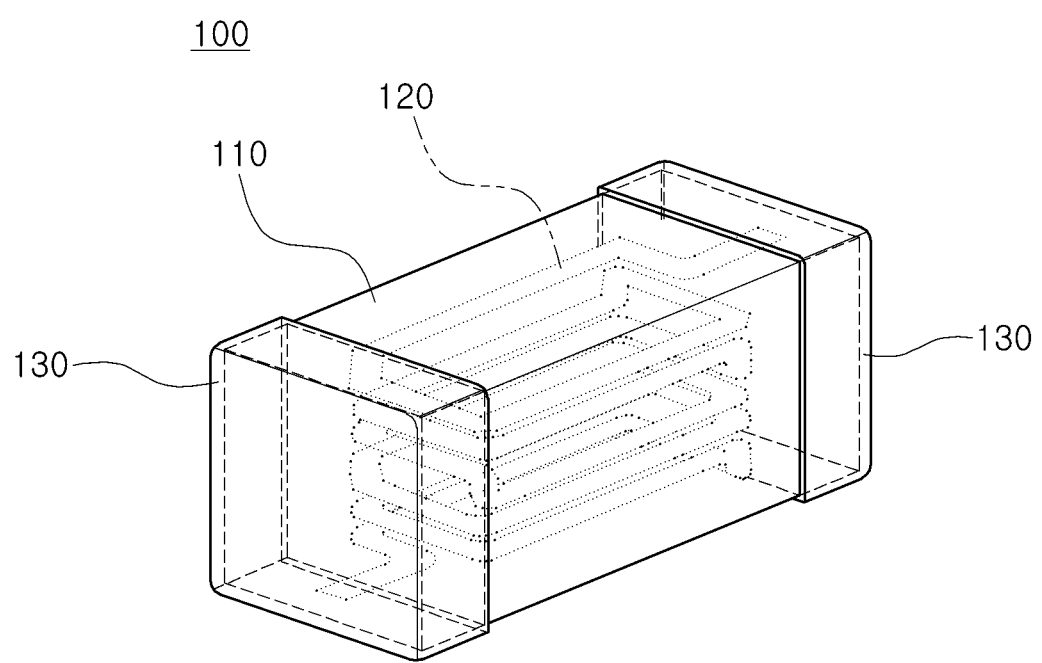
FIG. 1 is a perspective view illustrating an inductor according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Hereinafter, a ferrite and a coil electronic component including the same according to exemplary embodiments in the present disclosure will be described. Particularly, as an example of the coil electronic component, a multilayer inductor will be described, but the coil electronic component is not limited thereto.

Coil Electronic Component

Figure 2:
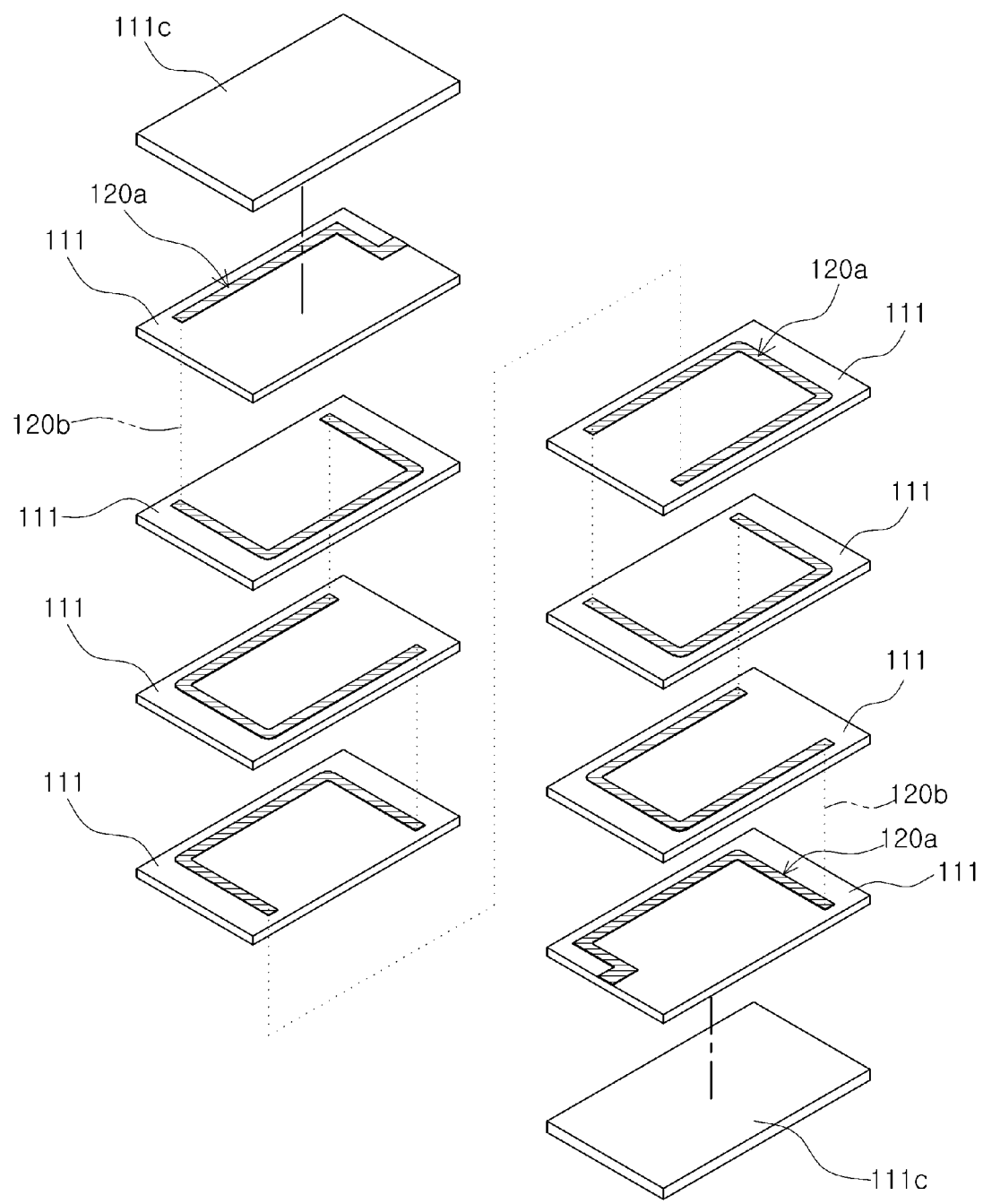
FIG. 2 is an exploded perspective view illustrating a structure in which magnetic layers and conductive patterns of the inductor are formed according to an exemplary embodiment in the present disclosure.

FIG. 1 is a perspective view illustrating an inductor according to an exemplary embodiment in the present disclosure, and FIG. 2 is an exploded perspective view illustrating a structure in which magnetic layers and conductive patterns of the inductor are formed according to the exemplary embodiment in the present disclosure.

Figure 3:
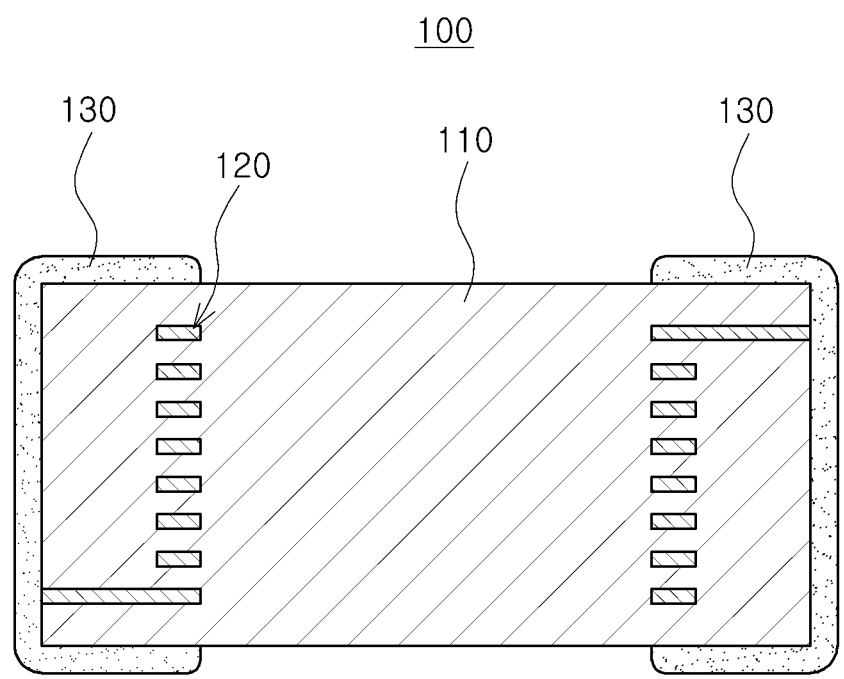
FIG. 3 is a cross-sectional view schematically illustrating the inductor according to an exemplary embodiment in the present disclosure.

FIG. 3 is a cross-sectional view schematically illustrating the inductor according to the exemplary embodiment in the present disclosure.

Referring to FIGS. 1 through 3, an inductor 100 according to an exemplary embodiment in the present disclosure may include a magnetic body 110, a coil part 120, and external electrodes 130.

The magnetic body 110 may be formed by laminating a plurality of magnetic layers 111 in a thickness direction and then sintering the laminated magnetic layers. In this case, a shape and dimensions of the magnetic body 110 and the number of laminated magnetic layers 111 are not limited to those of the present exemplary embodiment illustrated in the accompanying drawings.

The shape of the magnetic body 110 is not particularly limited, but may be, for example, substantially hexahedral. In the present exemplary embodiment, for convenience of explanation, two surfaces of the magnetic body 110 opposing each other in the thickness direction may be defined as upper and lower surfaces, two surfaces connecting the upper and lower surfaces to each other and opposing each other in a length direction may be defined as first and second end surfaces, and two surfaces vertically intersecting with the end surfaces and opposing each other in a width direction may be defined as third and fourth side surfaces.

The magnetic body 110 may contain a ferrite according to an exemplary embodiment in the present disclosure to be described below.

The ferrite may contain iron (Fe), nickel (Ni), zinc (Zn), and copper (Cu), wherein in the ferrite, a content of iron (Fe) calculated in terms of iron oxide ($Fe_2O_3$) may be 48 to 50 mol %, a content of nickel (Ni) calculated in terms of nickel oxide (NiO) may be 8 to 12 mol %, a content of zinc (Zn) calculated in terms of zinc oxide (ZnO) may be 28 to 31 mol %, and a content of copper (Cu) calculated in terms of copper oxide (CuO) may be 7 to 13 mol %, but a detailed description thereof will be provided later.

For example, the ferrite may be formed of $aFe_2O_3$-bNiO-cZnO-dCuO, wherein a, b, c, and d may satisfy $48 \le a \le 50$, $8 \le b \le 12$, $28 \le c \le 31$, and $7 \le d \le 13$, respectively.

Here, a, b, c, and d may satisfy $a+b+c+d=100$.

When a mol % of nickel (Ni), calculated in terms of nickel oxide (NiO), is defined as b, a mol % of zinc (Zn), calculated in terms of zinc oxide (ZnO), is defined as c, and a mol % of copper (Cu), calculated in terms of copper oxide (CuO), is defined as d, the ferrite may satisfy $2.6 \le c/b \le 3$ and $2.4 \le c/d \le 3.3$.

The above-mentioned ferrite according to the present disclosure may be variously applied to coil electronic components as well as the magnetic body of the multilayer inductor according to the present exemplary embodiment.

The plurality of magnetic layers may contain the above-mentioned ferrite, and thus, the magnetic body may contain the ferrite.

The magnetic layer 111 according to the present disclosure may contain the ferrite according to the above-mentioned exemplary embodiment in the present disclosure, and may be formed by sintering. Although not limited thereto, the magnetic layer 111 may be formed by mixing ceramic magnetic material powder containing the ferrite according to the present disclosure together with a binder, and the like, in a solvent, uniformly dispersing the ceramic magnetic material powder in the solvent using a ball milling method, or the like, manufacturing a thin magnetic sheet using a doctor blade method, or the like, and then sintering the manufactured magnetic sheet.

Conductive patterns 120a for forming the coil part 120 may be formed on one surface of the plurality of magnetic layers, and conductive vias 120b for electrically connecting vertically positioned conductive patterns to each other may be formed to penetrate through the magnetic layer in a thickness direction.

Therefore, ends of the conductive patterns formed on respective magnetic layers may be electrically connected to each other through conductive vias formed on the magnetic layers adjacent thereto, thereby forming the coil part 120.

In addition, both ends of the coil part 120 may be exposed to the outside through the magnetic body 110 to thereby be electrically connected to a pair of external electrodes 130 formed on the magnetic body 110, respectively, while coming into contact with the pair of external electrodes 130.

In particular, each end of the coil part 120 may be exposed at respective ends of the magnetic body 110, and the pair of external electrodes may be formed on each end of the magnetic body 110 to connect to a respective end of the coil part 120.

The conductive pattern may be formed on a sheet for forming the magnetic layer using a conductive paste for forming a conductive pattern by a thick film printing method, a coating method, a deposition method, a sputtering method, and the like, but a method of manufacturing the conductive pattern is not limited thereto.

The conductive via may be formed by forming a through hole in each of the sheets in the thickness direction and filling the through hole with a conductive paste or the like, but a method of forming the conductive via is not limited thereto.

Furthermore, as a conductive metal contained in the conductive paste forming the conductive pattern, one of silver (Ag), palladium (Pd), platinum (Pt), nickel (Ni), and copper (Cu), alloys thereof, or the like, may be used, but the conductive metal is not limited thereto.

Further, at least one cover layer 111c may be formed on upper and lower surfaces of the magnetic body 110, respectively.

The cover layer 111c may be formed of the same material and may have a configuration the same as the magnetic layer 111, except that the conductive pattern of the coil part is not included therein.

The cover layer 111c as described above may serve to prevent the coil part 120 from being damaged by physical or chemical stress.

The external electrodes 130 may come into contact with both ends of the coil part 120 exposed through the magnetic body 110 to thereby be electrically connected thereto, respectively.

The external electrodes 130 as described above may be formed on the magnetic body 110 by dipping the magnetic body 110 in a conductive paste, or using various methods such as a printing method, a deposition method, a sputtering method, or the like.

The conductive paste may be formed of a material containing one of silver (Ag), copper (Cu), and a copper (Cu) alloy, but the material of the conductive paste is not limited thereto.

In addition, if necessary, nickel (Ni) plating layers (not illustrated) and tin (Sn) plating layers (not illustrated) may be further formed on outer surfaces of the external electrodes 130.

Ferrite

The ferrite according to the exemplary embodiment in the present disclosure may contain iron (Fe), nickel (Ni), zinc (Zn), and copper (Cu).

The ferrite may contain 48 to 50 mol % of iron (Fe) calculated in terms of iron oxide ($Fe_2O_3$), 8 to 12 mol % of nickel (Ni) calculated in terms of nickel oxide (NiO), 28 to 31 mol % of zinc (Zn) calculated in terms of zinc oxide (ZnO), and 7 to 13 mol % of copper (Cu) calculated in terms of copper oxide (CuO).

For example, the ferrite may be formed of $aFe_2O_3$-bNiO-cZnO-dCuO, wherein a, b, c, and d may satisfy 48≤a≤50, 8≤b≤12, 28≤c≤31, and 7≤d≤13, respectively.

Here, a, b, c, and d may satisfy a+b+c+d=100.

The ferrite may contain iron, nickel, zinc, and copper as in the above-mentioned composition, such that high magnetic permeability and a high Curie temperature may be implemented therein.

When a content of iron oxide ($Fe_2O_3$) is less than 48 mol %, magnetic permeability may be decreased, and when the content is greater than 50 mol %, sintering properties of the ferrite may be deteriorated, and conductivity thereof may be increased.

When a content of the nickel oxide (NiO) is less than 8 mol %, a Curie temperature may be decreased, and when the content is more than 12 mol %, magnetic permeability may be decreased.

When a content of the zinc oxide (ZnO) is less than 28 mol %, magnetic permeability may be decreased, and when the content is more than 31 mol %, the Curie temperature may be decreased.

When a content of the copper oxide (CuO) is less than 7 mol %, the sintering properties of the ferrite may be deteriorated, and when the content is more than 13 mol %, magnetic permeability and the Curie temperature may be decreased.

According to an exemplary embodiment in the present disclosure, when a mol % of nickel (Ni) calculated in terms of nickel oxide (NiO) is defined as b, a mol % of zinc (Zn) calculated in terms of zinc oxide (ZnO) is defined as c, and a mol % of copper (Cu) calculated in terms of copper oxide (CuO) is defined as d, the ferrite may satisfy 2.6≤c/b≤3 and 2.4≤c/d≤3.3.

In the ferrite according to the exemplary embodiment in the present disclosure in which the content of zinc oxide (ZnO) is limited in order to implement a high Curie temperature and a content range of iron oxide ($Fe_2O_3$) is not wide due to problems in the sintering properties and conductivity, high magnetic permeability and excellent high-temperature characteristics may be implemented by adjusting relative contents of the nickel oxide (NiO) and copper oxide (CuO) depending on the content of zinc oxide (ZnO).

When the contents of nickel oxide (NiO), zinc oxide (ZnO), and copper oxide (CuO) satisfy 2.6≤ZnO/NiO≤3 and 2.4≤ZnO/CuO≤3.3, ferrite having high magnetic permeability and excellent high-temperature characteristics may be provided.

Experimental Example

The following Table 1 illustrates density after sintering, magnetic permeability, and high-temperature characteristics of manufactured toroidal cores depending on contents of iron oxide ($Fe_2O_3$), nickel oxide (NiO), zinc oxide (ZnO), and copper oxide (CuO) in NiZnCn based ferrites.

The high-temperature characteristics were evaluated by measuring an impedance decrease rate (%) at 125° C.

TABLE 1

| Sample | Content (mol %) | | | | Content Ratio | | Sintering Temperature (° C.) | Density (g/cc) | Characteristics | |
| | $Fe_2O_3$ | NiO | ZnO | CuO | ZnO/NiO | ZnO/CuO | | | Magnetic Permeability | Impedance Decrease Rate (%) |
|---|---|---|---|---|---|---|---|---|---|---|
| 1  | 49.05 | 11.70 | 30.06 | 9.10  | 2.57 | 3.30 | 920 | 5.3 | 957  | −21 |
| 2  | 49.06 | 11.44 | 30.27 | 9.23  | 2.65 | 3.28 | 920 | 5.2 | 1043 | −20 |
| 3  | 49.07 | 11.18 | 30.48 | 9.27  | 2.73 | 3.29 | 920 | 5.3 | 1065 | −25 |
| 4  | 49.08 | 10.92 | 30.70 | 9.30  | 2.81 | 3.30 | 920 | 5.2 | 1111 | −30 |
| 5  | 49.09 | 10.66 | 30.91 | 9.34  | 2.90 | 3.31 | 920 | 5.2 | 1061 | −67 |
| 6  | 49.10 | 10.40 | 31.12 | 9.38  | 2.99 | 3.32 | 920 | 5.2 | 1105 | −85 |
| 7  | 49.11 | 10.14 | 31.33 | 9.42  | 3.09 | 3.33 | 920 | 5.1 | 1130 | −93 |
| 8  | 49.12 | 9.88  | 31.54 | 9.46  | 3.19 | 3.33 | 920 | 5.2 | 1162 | −100 |
| 9  | 49.15 | 9.10  | 32.18 | 9.57  | 3.55 | 3.36 | 920 | 5.2 | 1200 | −100 |
| 10 | 49.00 | 10.00 | 29.50 | 11.50 | 2.95 | 2.66 | 920 | 5.2 | 1205 | −2 |
| 11 | 49.00 | 10.00 | 30.00 | 11.00 | 3.00 | 2.73 | 920 | 5.2 | 1261 | −11 |
| 12 | 49.00 | 10.00 | 30.50 | 10.50 | 3.05 | 2.90 | 920 | 5.2 | 1293 | −66 |
| 13 | 49.00 | 10.00 | 31.00 | 10.00 | 3.10 | 3.10 | 920 | 5.1 | 1285 | −98 |
| 14 | 49.00 | 10.00 | 29.00 | 12.00 | 2.90 | 2.42 | 920 | 5.3 | 1245 | −5 |
| 15 | 49.00 | 9.50  | 29.50 | 12.00 | 3.11 | 2.46 | 920 | 5.3 | 1160 | −31 |
| 16 | 49.00 | 9.00  | 29.50 | 12.50 | 3.28 | 2.36 | 920 | 5.3 | 1230 | −38 |

Referring to Table 1, it may be confirmed that when a ratio of ZnO/NiO was in a range of 2.60 to 3.00 and a ratio of ZnO/CuO was in a range of 2.40 to 3.30, high magnetic permeability and high-temperature characteristics were simultaneously satisfied.

Figure 4:
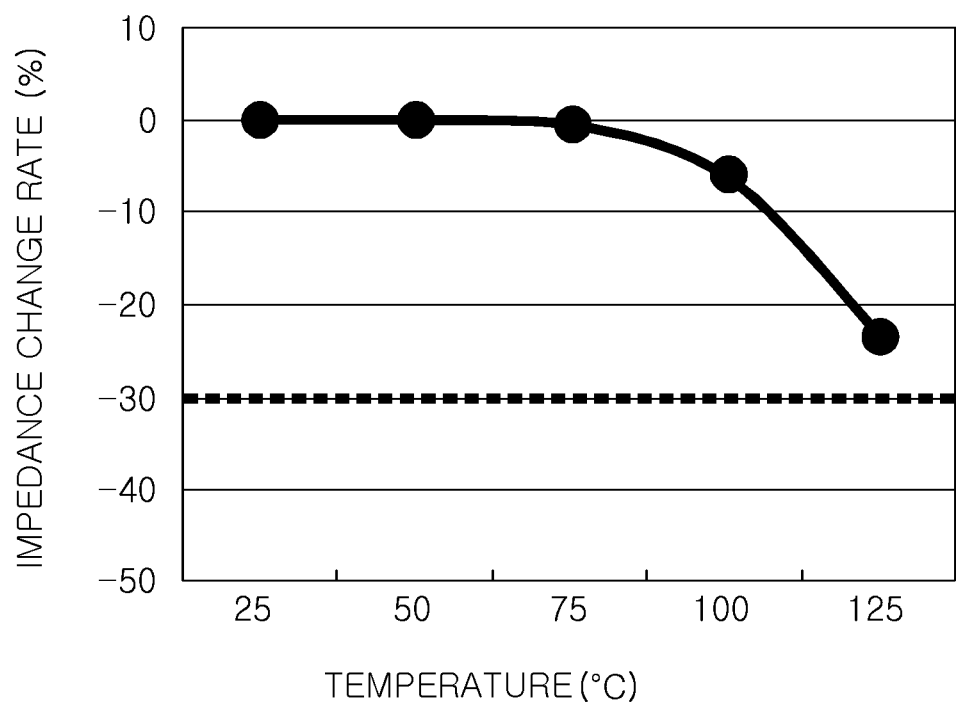
FIG. 4 is a graph illustrating a result obtained by evaluating an impedance change rate depending on a temperature of a coil electronic component containing a ferrite according to an exemplary embodiment in the present disclosure.

FIG. 4 is a graph illustrating a result obtained by applying a ferrite having a composition of sample 11 of Table 1 to a multilayer bead inductor and evaluating an impedance change rate thereof depending on a temperature.

As illustrated in FIG. 4, it may be confirmed that in a case of the multilayer bead inductor to which the ferrite having the composition of sample 11 was applied, the impedance change rate at 125° C. was about −23%, which was improved as compared to the existing material, such that impedance characteristics may be implemented even at a high temperature without significantly deteriorating magnetic characteristics, and the ferrite may be used as a ferrite material of an electric field electronic product.

As set forth above, according to exemplary embodiments in the present disclosure, the ferrite having high magnetic permeability and excellent high-temperature characteristics and the coil electronic component including the same may be provided.

While exemplary embodiments have been shown and described above, it will be apparent to those skilled in the art that modifications and variations could be made without departing from the scope of the present invention as defined by the appended claims.

What is claimed is:

1. A coil electronic component comprising:
   a magnetic body containing a ferrite; and
   a coil part including a plurality of conductive patterns disposed in the magnetic body,
   wherein the ferrite contains:
   48 to 50 mol % of iron oxide calculated in terms of $Fe_2O_3$,
   8 to 12 mol % nickel oxide calculated in terms of NiO,
   28 to 31 mol % zinc oxide calculated in terms of ZnO, and
   7 to 13 mol % copper oxide calculated in terms of CuO,
   wherein $2.6 \leq c/b \leq 3$ and $2.4 \leq c/d \leq 3.3$, where b is a mol % of the nickel oxide, c is a mol % of the zinc oxide, and d is a mol % of the copper oxide.

2. The coil electronic component of claim 1, wherein the magnetic body comprises a plurality of sintered laminated magnetic layers containing the ferrite.

\* \* \* \* \*